United States Patent
Zhang

(10) Patent No.: US 12,436,796 B2
(45) Date of Patent: Oct. 7, 2025

(54) METHOD OF MEASURING CONFIDENTIAL COMPUTING APPLICATION LAYER AND SYSTEM THEREOF

(71) Applicant: Nanhu Laboratory, Jiaxing (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/012,062

(22) Filed: Jan. 7, 2025

(65) Prior Publication Data

US 2025/0265109 A1    Aug. 21, 2025

(30) Foreign Application Priority Data

Feb. 20, 2024  (CN) .......................... 202410188323.1

(51) Int. Cl.
  *G06F 9/455* (2018.01)
(52) U.S. Cl.
  CPC ............... *G06F 9/45558* (2013.01); *G06F 2009/45587* (2013.01)
(58) Field of Classification Search
  None
  See application file for complete search history.

(56) References Cited

U.S. PATENT DOCUMENTS 8,886,929 B2 * 11/2014 Smith ................. G06F 9/45558
  713/157

FOREIGN PATENT DOCUMENTS

EP   4418115 A1 * 8/2024 ............. G06F 21/44

OTHER PUBLICATIONS

CNIPA, Office Action, Application No. 202410188323.1, Mar. 29, 2024.

* cited by examiner

*Primary Examiner* — Bradley A Teets
*Assistant Examiner* — Melissa A Headly
(74) *Attorney, Agent, or Firm* — WCF IP

(57) ABSTRACT

Provided is a novel method of measuring a confidential computing application layer and a system thereof. The method includes: utilizing characteristic of static measurement of an existing underlying component of confidential computing at a virtual machine level to realize the trusted measurement of a trigger module TG_APP at an underlying measurement level; utilizing the TG_APP which is subjected to the trusted measurement to carry out the trusted measurement of a user-mode application; and utilizing the trusted TG_APP which is measured by a confidential computing chip layer to realize the trusted measurement of the application layer. The method not only avoids the problem of a huge amount of measurement of confidential computing, but also realizes the measurement of the accurate application of the application layer, which well solves the problem of measurement of the confidential computing application layer based on a virtual machine.

12 Claims, 3 Drawing Sheets

METHOD OF MEASURING CONFIDENTIAL COMPUTING APPLICATION LAYER AND SYSTEM THEREOF

CROSS-REFERENCE TO RELATED PRESENT DISCLOSURE

This patent application claims the benefit and priority of Chinese Patent Present disclosure No. 202410188323.1, filed with the China National Intellectual Property Administration on Feb. 20, 2024, the disclosure of which is incorporated by reference herein in its entirety as part of the application.

TECHNICAL FIELD

The present disclosure belongs to the technical field of confidential computing, and in particular relates to a novel method of measuring a confidential computing application layer and a system thereof.

BACKGROUND

Privacy computing or confidential computing based on a Central Processing Unit (CPU) level refers to a trusted execution environment based on chip-level trusted base, and is not controlled by a system layer and a kernel layer (that is, the data and operation in the security environment cannot be viewed, tampered with or controlled in the case of the highest management authority of a computer system or the right of control at the kernel level), so as to ensure the security of data privacy protection and the trustworthiness of operation in the trusted execution environment. At present, the corresponding technologies include Intel SGX (Software Guard Extensions) technology, Intel TDX (Trust Domain Extensions) technology, AMD SEV (Secure Encrypted Virtualization) technology, Haiguang CSV (China Secure Virtualization) technology and so on.

Confidential computing can be divided into two categories: a first category of confidential computing is mature application-based confidential computing, such as Intel SGX technology; and a second category of confidential computing is a new generation of confidential computing based on a virtual machine level which is still developing, such as Intel TXD, AMD SEV, Haiguang CSV technology and so on.

The core of confidential computing is remote attestation: the application is started in the trusted execution environment of confidential computing, the trusted execution environment and the application are measured, and a chip-level signature report is generate in a manner of being signed by the hardware (chip). The report is sent to the remote user. The remote user verifies the legality of the report based on the relevant verification mechanism, extracts the measurement value from the report and compares the measurement value with the expected measurement value saved by the remote user. If the measurement value is consistent with the expected measurement value, a secure connection continues to be established with the trusted environment.

At present, in confidential computing based on the virtual machine level (Intel TDX, AMD SEV, Haiguang CSV and so on), the above measurement only measures TCB (Trusted Computing Base)+Firmware+Virtual Machine OS (shim/grub (kernel firmware), kernel, and initrd (Memory File System), but does not cover the application layer. Therefore, the remote user cannot judge legality of the application in the trusted execution environment. The main reason is that the confidential computing at a Virtual Machine (VM) level is a virtual machine with its own Operating System (OS), on which different applications can operate. The applications thereon can be started or stopped at any time. Based on this background, at the beginning of designing the confidential computing at the VM level, it was believed that the application on the virtual machine OS were too large to cover the application layer. However, during the implementation of this technology, it was found that it is still necessary to identify the application measurement, because if malicious applications are deployed in the trusted execution environment, the application measurement cannot be effectively identified at the time of remote attestation measurement verification, which will result in security risks.

SUMMARY

The purpose of the present disclosure is to solve the above problems, and to propose a novel method of measuring a confidential computing application layer and a system thereof. This scheme carries out dynamic extension based on the static measurement characteristics of the existing underlying component of confidential computing at the virtual machine level, so as to implement the highly trusted measurement of the application layer more quickly in a more trusted manner. This scheme is not only a scheme of measuring an application layer for a novel confidential computing application, that is, a virtual machine-based confidential computing application, but also a novel scheme of measuring an application layer proposed for the confidential computing application.

The present disclosure relate to a novel method of measuring a confidential computing application layer, which includes a confidential computing virtual machine, wherein a trigger module is deployed in an underlying component in which the confidential computing virtual machine is capable of being measured, and the confidential computing application layer based on a virtual machine level is measured by the following steps:

starting and loading, by the confidential computing virtual machine, the underlying component;

completing the trusted measurement of the trigger module for the native chip-level trusted measurement of the underlying component in which the trigger module is deployed based on the confidential computing;

triggering a user-mode application by using the triggering module and carrying out the trusted measurement on a user-mode application to obtain a trusted measurement value M;

providing the trusted measurement value M signed at a chip level to a remote user, so that the remote user carries out trusted verification on the user-mode application.

In the novel method of measuring the confidential computing application layer described above, the trusted measurement value M is provided to the remote user by the following steps:

generating, by the trigger module, a chip-level report which is signed at the chip level and includes an underlying measurement value obtained by measuring the underlying component, the trusted measurement value M and public key information P of remote attestation security connection to be established by triggering a confidential computing native Application Programming Interface (API);

providing the chip-level report to the remote user, so that the remote user carries out trusted verification on the user-mode application, and a secure connection with the trigger module is established based on P after the trusted verification passes.

In the novel method of measuring the confidential computing application layer described above, the trigger module is triggered to operate when the underlying component is loaded;

the underlying component of the confidential computing virtual machine include a virtual machine (VM) memory file system and a kernel layer;

the trigger module is deployed in the VM memory file system or the kernel layer.

In the novel method of measuring the confidential computing application layer described above, the process of carrying out the trusted measurement on a user-mode application by the triggering module includes static measurement and/or dynamic measurement;

the static measurement is to measure an application file of the user-mode application before the user-mode application is started, and trigger the start of the application after the measurement verification of the user-mode application passes;

the dynamic measurement is to measure various parameters at different times in the operating state of the application after the user-mode application is started.

In the novel method of measuring the confidential computing application layer described above, during the static measurement;

after the remote user passes the trusted verification of the user-mode application based on a measurement result, the secret data S of the original data needed by the user-mode application is transmitted to the trigger module through the secure connection;

the trigger module triggers the start of the corresponding user-mode application after receiving the secret data S, and transmits the secret data S to the user-mode application in the form of parameters for use (such as decryption or access to an encrypted database for use);

the method specifically includes:

if the user-mode application to be started is pre-installed in the confidential computing virtual machine, measuring, by the trigger module, the application file of the user-mode application, such as evaluating the hash value of the application file;

if the user-mode application to be started is not pre-installed in the confidential computing virtual machine, pulling, by the trigger module, an application according to the specified parameters and measuring the pulled application by measuring the application file of the user-mode application or parsing and measuring a configuration file corresponding to the application (for example, a docker manifest configuration file, in which the application needs a legal and effective configuration file to be started normally).

In the novel method of measuring the confidential computing application layer described above, during the dynamic measurement, the trigger module triggers the start of the corresponding user-mode application and establishes a communication mechanism with the user-mode application;

the trigger module carries out dynamic measurement on the user-mode application at at least one specific time node. The number of dynamic measurements corresponds to the number of specific time nodes. The time node of measurement can be specified by a remote user or other interested parties or determined according to specific rules.

The trusted measurement value M of each dynamic measurement is provided to the remote user;

the remote user transmits the secret data S of the original data needed by the user-mode application to the trigger module through the secure connection after passing the trusted verification of the user-mode application base on at least one dynamic measurement result;

after receiving the secret data S, the trigger module transmits the secret data S to the user-mode application through the communication mechanism, so that the user-mode application uses the required original data;

the measurement method is to measure the measurement information MI related to the operating state of the user-mode application, and the trusted measurement value M is the original information of the Measurement Information (M=MI) or a hash value (M=Hash(MI)) of the original information of the MI, and for the hash value, the MI information is sent to the remote user preferably through the transmission methods other than the chip-level report.

In the novel method of measuring the confidential computing application layer described above, the method further includes:

dividing the original data which is provided to confidential computing and is used by the user-mode application into n blocks and making the blocks corresponding to different secret data S1 to Sn, wherein each block of data Di corresponds to secret data Si, i=1 . . . n, representing an i-th data and an i-th secret data;

measuring, by the trigger module, the user-mode application for n times sequentially according to the setting (such as based on the time node selected by the interested party); wherein the measurement can be the static measurement (measurement before the start of the application) or the dynamic measurement (measurement after the start of the application) during the first time, and the measurement can be the measurement in the operating process of the user-mode application during the subsequent n−1 times.

The remote user decides to send or refuse to send the secret data Si corresponding to Pi in the i-th stage to a confidential computing user based on results of the i-th measurement verification (if Si is the key of the data, the secret data Si of the i-th data Di corresponding to Pi in the i-th stage is sent or refused to be sent to the confidential computing user).

In the novel method of measuring the confidential computing application layer described above, the user-mode application is divided into n stages, and the stages are corresponding to different secret data S1 to Sn, wherein Pi in each stage corresponds to secret data Si, i=1 . . . n, representing an i-th stage and an i-th secret data. The user-mode application can be divided by the trigger module, or by the application itself, or by the remote user, which is not limited here. The user-mode application can be divided manually or according to some set rules. Here, it is preferable to divide the user-mode application by the end providing the original data. The original data which is provided to confidential computing and is used by the user-mode application is divided into n blocks according to the use stage of the data by the user-mode application, and secret data such as n encryption keys or n database authorization domain passwords are generated for the n blocks of data, respectively. In addition, Si can also refer to the situation that n keys are used to unlock the secret data Si needed by various applications that use n different operating stages, such as unlocking the next execution of the application.

The trigger module carries out a measurement once at the starting point of each stage. The starting point of a stage is mainly the end point of the previous stage;

the remote user decides to send or refuse to send the secret data Si of the i-th data Di corresponding to the i-th stage to the confidential computing user based on results of the i-th measurement verification.

A confidential computing system is provided, wherein the confidential computing system implements the method of measuring the confidential computing application layer described above, which includes a confidential computing virtual machine, wherein a trigger module is deployed in an underlying component in which the confidential computing virtual machine is capable of being measured, and the trigger module is started when the underlying component is loaded, and implements the trusted measurement of confidential computing on the static measurement characteristics of the underlying component based on confidential computing;

and the trigger module is configured to trigger a user-mode application needing to operate in a confidential computing environment, carry out the trusted measurement of the user-mode application, and embed the trusted measurement value M into a chip-level signature report to be sent to the remote user.

In the confidential computing system described above, the trigger module is deployed in a virtual machine (VM) memory file system or a kernel layer of the confidential computing virtual machine;

the trigger module carries out static measurement and/or dynamic measurement on the user-mode application according to the setting.

The present disclosure has the following advantages.

1. In this scheme, the method includes: utilizing characteristic of static measurement of an existing underlying component (such as the memory file system initrd) of confidential computing at a virtual machine level to realize the trusted measurement of a trigger module TG_APP at an underlying measurement level; utilizing the TG_APP which is subjected to the trusted measurement to carry out the trusted measurement of a user-mode application; and utilizing the trusted TG_APP which is measured by a confidential computing chip layer to realize the trusted measurement of the application layer. The method not only avoids the problem of a huge amount of measurement of confidential computing, but also realizes the measurement of the accurate application of the application layer, which well solves the problem of measurement of the confidential computing application layer based on a virtual machine.

2. This scheme puts forward the dynamic measurement of the application layer for the first time, and provides a strategy that can support the dynamic measurement after the application is started (or even many times), which can prevent the trustworthiness of the confidential computing application after being started, and prevent the attack that the confidential computing application is tampered with by viruses injected by other potential attack applications operated in the trusted execution environment or steals relevant data after being started.

3. This scheme carries out efficient extension based on the existing measurement mechanism of confidential computing at the virtual machine level, so as to support the chip-level measurement and the remote attestation at the application level, and supports the static measurement and the dynamic measurement at the same time, thereby implementing the highly trusted static and dynamic measurement of the application layer more quickly in a more trusted manner and completing the remote attestation process of confidential computing;

4. This scheme not only can prevent the trustworthiness of the confidential computing application when being started, but also can prevent the trustworthiness of the confidential computing application after being started. Through the method of the present disclosure, the operating state security of the confidential computing application can be monitored in real time, and the secret information can be sent to the confidential computing application in one or more batches according to the actual situation, so as to achieve the purpose of data security based on dynamic measurement.

DETAILED DESCRIPTION OF THE EMBODIMENTS

The present disclosure will be further described in detail with reference to the attached drawings and detailed description.

Embodiment 1

Figure 1:
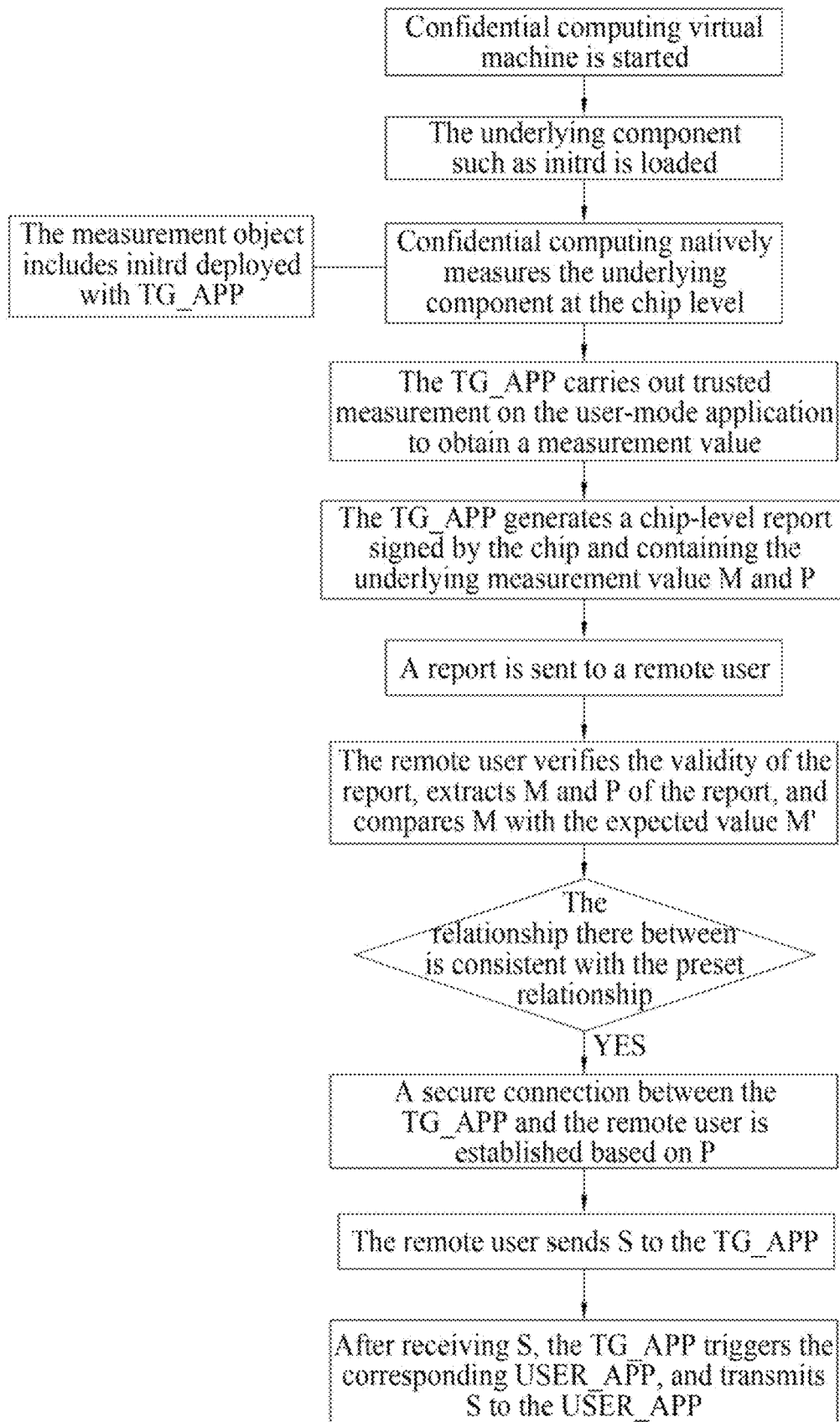
FIG. 1 is a static measurement flow chart of a novel method of measuring a confidential computing application layer in Embodiment 1 according to the present disclosure.

As shown in FIG. 1, this scheme provides a confidential computing system and a method of measuring a confidential computing application layer of the confidential computing system. The confidential computing based on a virtual machine level can be applied to the current Intel TDX, AMD SEV and Haiguang CSV to improve its technology, and can also be applied to the confidential computing technology based on a virtual machine level developed in the future.

Before the confidential computing operates, the image of the confidential computing virtual machine is deployed first. The scheme has the characteristics that a trigger module (TG_APP) is deployed in the underlying component of the confidential computing virtual machine, that is, the VM memory file system (initrd), and the TG_APP application is triggered to operate when the initrd is loaded and started. The deployed TG_APP application is configured with the following functions.

1) The user-mode application (USER_APP) that needs to operate in a confidential computing environment is triggered.

2) The USER_APP is measured statically or/and dynamically.

3) The confidential computing API (Application Programming Interface) is called, the USER_APP measurement value M is written into the chip-level signature report (the report is written and is tamper-proof by the underlying chip and signature), and the report is sent to the remote user. In this embodiment, the TG_APP application is also responsible for establishing a secure connection with the remote user.

The TG_APP is deployed in initrd. When the confidential computing virtual machine is started, initrd will be natively measured by confidential computing at the chip level. This step is the same as the prior art. This scheme deploys the TG_APP to initrd. Therefore, the TG_APP itself is also natively measured at the chip level, thus ensuring the legality and validity of the TG_APP itself without being tampered with by confidential computing users. The characteristic of static measurement of an existing underlying component of confidential computing at a virtual machine level is utilized to realize the trusted measurement of the TG_APP at an underlying measurement level; and then the TG_APP which is subjected to the trusted measurement is utilized to carry out the trusted measurement of a user-mode application. Because the TG_APP is an application operated in initrd, the user-mode application needing to operate in the confidential computing environment can be triggered and measured in a highly trusted manner as needed. The trusted TG_APP which is measured is utilized to realize the trusted measurement of the application layer. This not only avoids the problem of a huge amount of measurement of confidential computing, but also realizes the measurement of the specified accurate application, which well solves the problem of measurement of the confidential computing application layer based on a virtual machine.

The user can set the options in the image of the confidential computing virtual machine as the static measurement or the dynamic measurement of the application.

When the confidential computing virtual machine (confidential computing VM) is started, the TG_APP in initrd is triggered. When the user sets the static measurement, Steps A1-A8 are executed. When the user sets the dynamic measurement, Steps B1-B11 are executed.

The static measurement of the confidential computing application layer is shown in FIG. 1.

A1. After the TG_APP application is started, it is ready to statically measure the application USER_APP. The USER_APP to be measured can be a user-mode application specified by the user or any user-mode application to be operated in a confidential computing environment.

The USER_APP can be pre-installed in the image of the confidential computing virtual machine (for example, an application pre-deployed in initrd), or can be pulled in real time and then started (for example, related components supporting the operation of the docker are pre-deployed in initrd, and the TG_APP pulls the docker image in real time and operates the docker application).

A2. The TG_APP measures the USER_APP, and the measurement value is M.

If the USER_APP is pre-installed in the image of the confidential computing virtual machine, the TG_APP can measure the application file to be started (for example, computing the hash values of all the application files to be started).

If the USER_APP is not pre-installed in the image of the confidential computing virtual machine, the TG_APP pulls the application according to the parameters specified by the user (for example, the docker image application docker pull<image> is pulled), and measures the pulled application (for example, the docker image file) by calculating the hash value of the application file or parsing the file-related configuration file to read related information (for example, the manifest file of the docker image, in which manifest cannot be tampered with, otherwise the docker application cannot be started normally).

A3. The TG_APP application is started to trigger the confidential computing native API to generate the chip-level report. The TG_APP application takes the measurement value M and the public key information P (such as a public key or a hash value of the public key) of remote attestation security connection (such as Remote Attestation-Transport Layer Security (RA-TLS) technology) to be established as input parameters of the API generating the chip-level report. The chip-level report is generated by calling this API. The report is signed by the chip and contains the measurement value M and P of the underlying component.

A4. The signature report is sent to the remote user (REMOTE_USER), and the REMOTE_USER verifies the validity of the chip-level report of confidential computing (based on the confidential computing verification certificate chain).

A5. After the report is verified to be valid, the measurement value M and P of the underlying component are extracted. The REMOTE_USER compares the measurement value M of the underlying component, the expected value of the measurement value of the underlying component of the REMOTE_USER, and the expected value M' of the application measurement.

A6. If the measurement value M of the underlying component is consistent with the expected value M' of the measurement value of the underlying component, the REMOTE_USER establishes a TLS secure connection with the TG_APP in the remote trusted execution environment based on P.

A7. The REMOTE_USER sends the secret data S (such as the decryption key of data entering the trusted execution environment, in which the data is provided to the trusted execution environment in an encrypted form before or after this, and S can be decrypted using the decryption key, or the data is provided to the trusted execution environment in other forms, such as S is the login password authorized by the remote database, etc.) to the TG_APP in the trusted execution environment based on the secure channel established by A6.

A8. The TG_APP triggers the related application USER_APP after receiving S, and sends S to the USER_APP (for example, in the form of application startup parameters). The USER_APP supports the upper-layer service logic based on S (such as the key for decrypting data) (such as decrypting private data in a trusted and secure environment to make the data available but invisible). Here, the USER_APP can also be started first, and then S is transmitted to the application in a communication manner.

The above is mainly about the trusted measurement and the trusted usage of the user-mode application. The measurement of the traditional underlying parts, such as TCB, Firmware, virtual machine OS, etc., is completed before the trusted measurement of applications, and is generally carried out when the confidential computing environment is started, which is consistent with the prior art, and which will not be described in detail here. After the measurement of the underlying components is completed in the confidential computing environment, the measurement value of the underlying component is stored in a secure location (such as a chip register). When carrying out the static measurement or the dynamic measurement, the trigger module calls the API of confidential computing, and the API writes the stored measurement value of the underlying component and the measurement value M of the application of the trigger module to the chip-level signature report to ensure the trustworthiness of the trigger module. In addition, the present disclosure further includes the following situations: the measurement value of the whole underlying component and the measurement value M of the specified upper-level application need to be re-measured for every dynamic or static measurement request.

Figure 2:
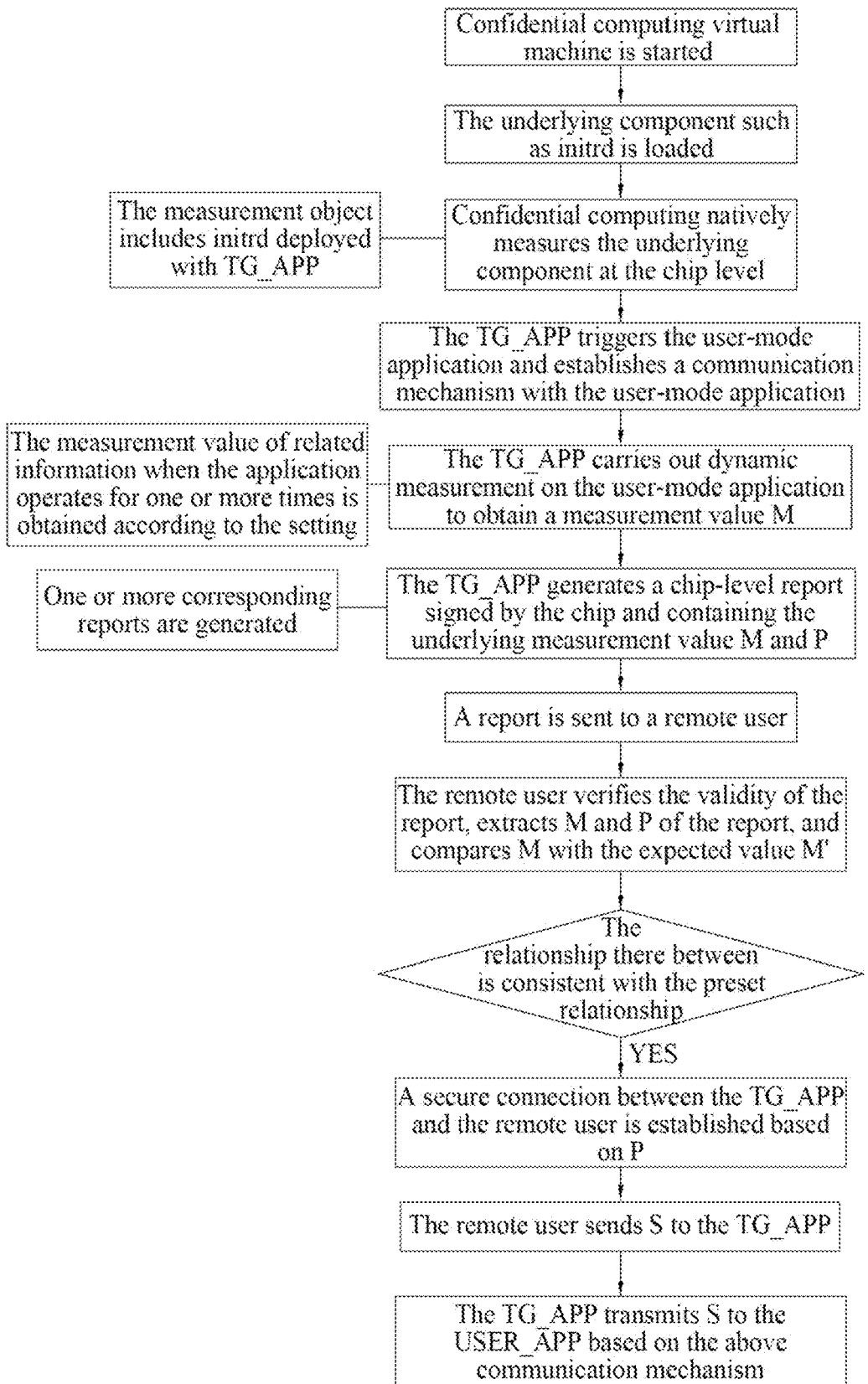
FIG. 2 is a dynamic measurement flow chart of a novel method of measuring a confidential computing application layer in Embodiment 1 according to the present disclosure.

The dynamic measurement of the confidential computing application layer is shown in FIG. 2.

B1. After the TG_APP application is started, it is ready to trigger the user-mode application USER_APP. The triggered USER_APP can be a user-mode application that is specified by the user and needs to be operated in a confidential computing environment and needs to be measured, or any user-mode application that will be operated in a confidential computing environment. At this time, it means that any user-mode application operated in a confidential computing environment is dynamically measured, and the dynamic parameters of a plurality of applications operated in a confidential computing environment can also be measured at the same time. The following term USER_APP can generally refer to one or more applications operated in a confidential computing environment.

Similarly, the USER_APP can be pre-installed in the image of the confidential computing virtual machine (for example, an application pre-deployed in initrd), or can be pulled in real time and then started (for example, related components supporting the operation of the docker are pre-deployed in initrd, and the TG_AP can pull the docker image in real time and operate the docker application).

B2. The TG_APP application triggers the user-mode application USER_APP, and establishes a communication mechanism with the application USER_APP, such as trusted interaction through a shared file system or the network connection.

B3. The TG_APP dynamically measures the USER_APP application.

As an option, the TG_APP can dynamically measure the USER_APP application based on the time node specified by the user. The confidential computing user can set the time node T (T can be one or more time nodes) of the dynamic measurement according to relevant requirements (such as the requirements of the REMOTE_USER).

In this embodiment, the dynamic measurement refers to the measurement of the information MI related to the operating state of the application. MI can be any information of the operating state of the application defined by the user, including but not limited to: 1) the starting time of the USER_APP application measured and recorded by the TG_APP; 2) the memory occupation size and the CPU utilization rate of the USER_APP at a certain time node measured by the TG_APP; 3) the opening status of the USER_APP network port, the external network connection status, and the data transmission status within a defined time period; 4) the USER_APP local data storage status and the disk occupation; 5) the possible environmental variable values in the operating state of the application; 6) the application log of the USER_APP or the key information (for example, including abnormal status information of the application, etc.) obtained from the application log of the USER_APP; 7) according to the relevant user requirement, dynamic measurement can further include a static measurement value of the USER_APP application file; 8) the real-time measurement value loaded into the memory by the USER_APP application; 9) if the USER_APP is a docker application, the information extracted from the docker operating state in the docker engine.

B4. The TG_APP application obtains the measurement value M. M can be the original information MI (M=MI) in the last step or the hash value Hash (MI) of the original information MI in the last step (M=Hash(MI)).

B5. The TG_APP application is started to trigger the confidential computing native API to generate a chip-level report. The measurement value M, the public key information P (such as a hash value of the public key) of remote attestation security connection (such as RA-TLS technology) to be established and the measurement value of the underlying component are written by the underlying confidential computing native API to generate the chip-level report. M and P are taken as the input parameters of the API generating the chip-level report. The measurement value of the underlying component is inserted into the report from the bottom of the API. The report is signed by the chip and contains the measurement value M and P of the underlying component.

B6. The signature report is sent to the remote user REMOTE_USER. If M=Hash (MI) in Step B4, the MI information is sent to the remote user REMOTE_USER through the same channel or other channels separately.

B7. The remote user REMOTE_USER verifies the validity of the chip-level report of confidential computing (based on the confidential computing verification certificate chain).

B8. After the report is verified to be valid, the measurement value M and P of the underlying component are extracted. The REMOTE_USER compares the measurement value of the underlying component and the expected value of the measurement value of the underlying component first. If the measurement value of the underlying component is consistent with the expected value of the measurement value of the underlying component, the REMOTE_USER verifies the legality of the M value. For example, M is compared with the expected value M' of the application measurement saved by the user to determine whether M is consistent with the expected value M. However, at this time, it is not limited to the comparison between M and M'. The values of M and M' can be different, and the REMOTE_USER can define relevant policies to determine whether the value of M is legal or not.

If M=Hash (MI) in B4, the REMOTE_USER needs to calculate the hash value of the received MI first, compare M extracted from the verification report with the calculated hash value, and if M is consistent with the calculated hash value, analyze whether the MI information meets the expectation of the REMOTE USER. If the MI information meets the expectation, it is judged that the M value is legal.

B9. If the value of M is legal, the REMOTE_USER establishes a TLS secure connection with the TG_APP in the remote trusted execution environment based on P.

B10. The REMOTE_USER sends the secret data S (such as the decryption key of data after the trusted execution environment) to the TG_APP in the trusted execution environment based on the secure connection established by B9.

B11. After receiving S, the TG_APP sends S to the USER_APP based on the communication mechanism in B2. The USER_APP can support the upper-layer service logic based on S (such as the key for decrypting data) ((such as decrypting private data in a trusted and secure environment to make the data available but invisible).

This scheme puts forward the dynamic measurement of the application layer for the first time, and provides a strategy that can support the dynamic measurement after the application is started (or even many times), which can prevent the trustworthiness of the confidential computing application after being started, and prevent the attack that the confidential computing application is tampered with by viruses injected by other potential attack applications operated in the trusted execution environment or steals relevant data after being started. In the case of a plurality of dynamic measurements, a secure connection with the trigger module can be established based on P after the first measurement verification passes, or after the last measurement verification passes before using the data, and S is given to the user-mode application through the secure connection. The subsequent measurement verification results can be used for reference by the remote user or for other purposes (because the key has been sent, the key is no longer the basis for deciding whether to send the key). In the case of a plurality of dynamic measurements, the chip-level report can generate a report for each measurement, or a report for several measurement values M. Each report contains M and the measurement value of the underlying component. The first report contains P, and the subsequent reports can contain P. It is preferable that each measurement P has a different value to ensure the security of sending si.

Further, the data can also be grouped and given a secret data S, and the corresponding S is given to the user-mode application after each measurement verification. This implementation will be specifically described in detail in Embodiment 2, which will not be described in detail here.

Of course, in practical application, the static measurement and the dynamic measurement can also be combined, and the static measurement and the dynamic measurement can be carried out at the same time. At this time, the corresponding user-mode application is measured and triggered by the static measurement strategy first, and then the corresponding user-mode application is dynamically measured by the dynamic measurement strategy. Since the application has been triggered and started, it is not necessary to trigger the application again here.

Embodiment 2

Figure 3:
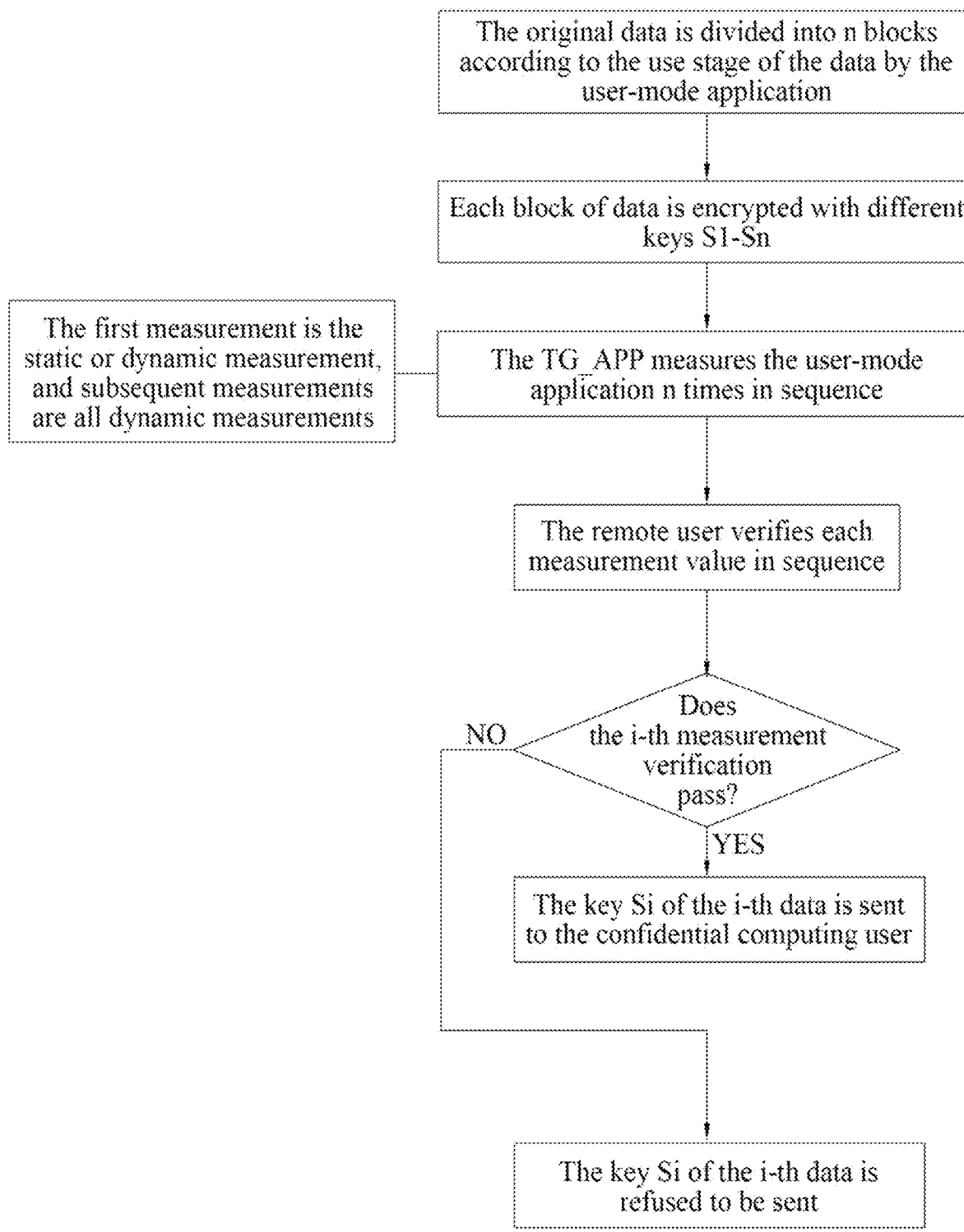
FIG. 3 is a flow chart of a method of sending keys in batches using a novel method of measuring a confidential computing application layer in Embodiment 2 according to the present disclosure.

As shown in FIG. 3, in this embodiment, the secret data sent by the REMOTE_USER to the TG_APP can be one of a plurality of secret data of the REMOTE_USER. The REMOTE_USER allows the confidential computing user to start a plurality of dynamic measurements, and transmits a secret data S after each dynamic measurement.

In this embodiment, the secret data S is taken as the key of the original data for further description. When the secret data is put into use, the secret data S can also be in other forms, and the implementation method is similar to the key, which will not be described in detail here.

Generally, the secret data S transmitted by the REMOTE_USER to the confidential computing user after remote attestation is the data decryption key. When the application is operating, the confidential computing user decrypts the corresponding data with the decryption key in the trusted execution environment. The decrypted data is calculated based on the application to obtain the result. In the whole process, the confidential computing user cannot see the plaintext data, so that the data is available but invisible.

The original data provided by the REMOTE_USER is divided into n blocks, which are encrypted by S1, S2, S3, . . . , Sn, respectively, and the encrypted data is sent to the confidential computing user.

When the confidential computing user generates the report for the first time (statically or dynamically) and sends the report to the REMOTE_USER, the REMOTE_USER sends S1 to the confidential computing user after verification (that is, to the TG_APP in the trusted execution environment), the TG_APP sends S1 to the USER_APP, and the USER_APP can decrypt some data with S1 to support the operation of the application in a first stage. Thereafter, when the TG_APP continues to operate, the confidential computing user generates the report containing the application measurement at different time nodes for the second, third, . . . , and n-th time according to the requirements of the REMOTE_USER and sends the report to the REMOTE_USER. The REMOTE_USER sends S2, S3, . . . , Sn to the confidential computing user in sequence after the measurement results are verified and pass, so that the confidential computing user decrypts the corresponding data, respectively, until the whole data is decrypted in the trusted execution environment, so as to support the upper-level service of the whole application. If the i-th measurement verification fails, the REMOTE_USER refuses to send Si to the confidential computing user, and it is preferred not to carry out subsequent verification and key transmission.

The data that will be reused in different stages may not be repeatedly encrypted. Corresponding to each stage, the USER_APP only encrypts the data that will be used for the first time with the corresponding key. If data B and C are used in the first stage and data A and B are used in the fifth stage, the USER_APP encrypts data B and C with the key S1 and encrypts data A with the key S5.

Each stage can also be independent of each other, and the data that will be used in each stage is encrypted with the corresponding key. For example, if data B and C are used in the first stage and data B and D are used in the third stage, data B and C will be encrypted with the key S1 and data B and D will be encrypted with the key S3.

This scheme can effectively prevent the attack that the application USER_APP is tampered with by viruses injected by other potential attack applications operated in the trusted execution environment or steals relevant data after being started, but the application USER_APP is trusted when it is started or at the initial stage of being started. Through the method of the present disclosure, the operating state security of the whole life cycle of the USER_APP application can be monitored in real time, and the privacy information can be sent to the confidential computing application USER_APP in batches according to the actual situation, so as to achieve the purpose of data security based on dynamic measurement.

The relationship between FIG. 2 and FIG. 3 is in accordance with the preset relationship, including that they are consistent with each other or a specific relationship is met.

Embodiment 3

In Embodiment 1, the TG_APP is deployed in initrd. In this embodiment, the TG_APP can also be deployed in other places that can be measured when the underlying component is subjected to the chip-level native measurement by confidential computing, such as in the kernel layer, that is, the place where the kernel layer (including the TG_APP) can be natively measured by the confidential computing hardware when the confidential computing image is started (that is, being loaded into memory and carrying out the chip-level measurement).

As note above, the static measurement is to measure the application files to be loaded and operated in the trusted execution environment before the application is started, and the dynamic measurement is to measure various parameters of the application at different times in the operating state of the application after the application is started.

The specific embodiments described in this embodiment are only illustrative of the spirit of the present disclosure. Those skilled in the field to which the present disclosure belongs can make various modifications or supplements to the described specific embodiments or substitute the described specific embodiments in a similar manner, which will not deviate from the spirit of the present disclosure or go beyond the scope defined in the appended claims.

What is claimed is:

1. A novel method of measuring a confidential computing application layer, which comprises a confidential computing virtual machine, wherein a trigger module is deployed in an underlying component in which the confidential computing virtual machine is capable of being measured, and the confidential computing application layer based on a virtual machine level is measured by the following steps:

starting and loading, by the confidential computing virtual machine, the underlying component;

measuring the trigger module for a native chip-level trusted measurement of the underlying component in which the trigger module is deployed based on confidential computing;

triggering a user-mode application by using the triggering module and carrying out a trusted measurement on the user-mode application to obtain one or more trusted measurement values M, wherein carrying out the trusted measurement on the user-mode application by the triggering module comprises static measurement and/or dynamic measurement;

providing the trusted measurement values M signed at a chip level to a remote user, so that the remote user carries out trusted verification on the user-mode application;

the trusted measurement values M is provided to the remote user by the following steps:

generating, by the trigger module, a chip-level report which is signed at the chip level and comprises an underlying measurement value obtained by measuring the underlying component, the trusted measurement values M, and public key information P of remote attestation security connection to be established by triggering a confidential computing native Application Programming Interface (API);

providing the chip-level report to the remote user, so that the remote user carries out trusted verification on the user-mode application, and a secure connection with the user-mode application and the trigger module is established based on P after the trusted verification passes;

the static measurement measures an application file of the user-mode application before the user-mode application is started, and triggers the start of the user-mode application after the measurement verification of the user-mode application passes;

the dynamic measurement measures various parameters of the user-mode application at different times in an operating state of the user-mode application after the user-mode application is started;

wherein during the static measurement, after the remote user passes the trusted verification of the user-mode application based on a measurement result, secret data S of original data needed by the user-mode application is transmitted to the trigger module through the secure connection, and the trigger module triggers the start of the corresponding user-mode application after receiving the secret data S, and transmits the secret data S to the user-mode application in the form of parameters, so that the user-mode application uses the required original data; and the triggering of the user-mode application by using the triggering module further comprises:

if the user-mode application to be started is pre-installed in the confidential computing virtual machine, measuring, by the trigger module, the application file of the user-mode application;

if the user-mode application to be started is not pre-installed in the confidential computing virtual machine, pulling, by the trigger module, an application according to specified parameters and measuring the pulled application by measuring the application file of the user-mode application or parsing and measuring a configuration file corresponding to the application.

2. The novel method of measuring the confidential computing application layer according to claim 1, wherein the trigger module is triggered to operate when the underlying component is loaded;

the underlying component of the confidential computing virtual machine comprise a virtual machine (VM) memory file system and a kernel layer; and the trigger module is deployed in the VM memory file system or the kernel layer.

3. The novel method of measuring the confidential computing application layer according to claim 1, wherein during the dynamic measurement, the trigger module triggers the start of the corresponding user-mode application and establishes a communication mechanism with the user-mode application;

the trigger module carries out the dynamic measurement on the user-mode application at at least one specific time node;

the trusted measurement value M of each dynamic measurement is provided to the remote user;

the remote user transmits the secret data S needed by the user-mode application to the trigger module through the secure connection after passing the trusted verification of the user-mode application base on at least one dynamic measurement result;

after receiving the secret data S, the trigger module transmits the secret data S to the user-mode application for use through the communication mechanism;

the measurement method is to measure the information related to the operating state of the user-mode application, and the trusted measurement value M is the original information of the Measurement Information (MI) or a hash value of the original information of the MI, and for the hash value, the MI information is provided to the remote user.

4. The novel method of measuring the confidential computing application layer according to claim 1, wherein the method further comprises:

dividing the original data which is provided to confidential computing application and is used by the user-mode application into n blocks and making the blocks corresponding to different secret data S1 to Sn, wherein each block of data Di corresponds to secret data Si, i=1 . . . n, wherein n is a positive integer, Di and Si respectively represent representing an i-th data and an i-th secret data;

measuring, by the trigger module, the user-mode application for n times sequentially in the operating process according to the setting; and deciding, by the remote user, to send or refuse to send the secret data Si of the data Di to a confidential computing user based on results of the i-th measurement verification.

5. The novel method of measuring the confidential computing application layer according to claim 1, wherein the method further comprises:
dividing the user-mode application into n stages, and making the stages corresponding to different secret data S t to Sn, wherein Pi in each stage corresponds to secret data Si, i=1 . . . n, wherein n is a positive integer, Pi and Si respectively represent representing an i-th stage and an i-th secret data;
carrying out, by the trigger module, a measurement once at the starting point of each stage; and
deciding, by the remote user, to send or refuse to send the secret data Si corresponding to the i-th stage to the confidential computing user based on results of the i-th measurement verification.

6. The novel method of measuring the confidential computing application layer according to claim 2, wherein the method further comprises:
dividing the original data which is provided to confidential computing and is used by the user-mode application into n blocks and making the blocks corresponding to different secret data Si to Sn, wherein each block of data Di corresponds to secret data Si, i=1 . . . n, wherein n is a positive integer, Di and Si respectively represent an i-th data and an i-th secret data;
measuring, by the trigger module, the user-mode application for n times sequentially in the operating process according to the setting; and
deciding, by the remote user, to send or refuse to send the secret data Si of the data Di to a confidential computing user based on results of the i-th measurement verification.

7. The novel method of measuring the confidential computing application layer according to claim 3, wherein the method further comprises:
dividing the original data which is provided to confidential computing and is used by the user-mode application into n blocks and making the blocks corresponding to different secret data S1 to Sn, wherein each block of data Di corresponds to secret data Si, i=1 . . . n, wherein n is a positive integer, Di and Si respectively represent an i-th data and an i-th secret data;
measuring, by the trigger module, the user-mode application for n times sequentially in the operating process according to the setting; and
deciding, by the remote user, to send or refuse to send the secret data Si of the data Di to a confidential computing user based on results of the i-th measurement verification.

8. The novel method of measuring the confidential computing application layer according to claim 2, wherein the method further comprises:
dividing the user-mode application into n stages, and making the stages corresponding to different secret data S1 to Sn, wherein Pi in each stage corresponds to secret data Si, i=1 . . . n, wherein n is a positive integer, Pi and Si respectively represent an i-th stage and an i-th secret data;
carrying out, by the trigger module, a measurement once at the starting point of each stage; and
deciding, by the remote user, to send or refuse to send the secret data Si corresponding to the i-th stage to the confidential computing user based on results of the i-th measurement verification.

9. The novel method of measuring the confidential computing application layer according to claim 3, wherein the method further comprises:
dividing the user-mode application into n stages, and making the stages corresponding to different secret data S1 to Sn, wherein Pi in each stage corresponds to secret data Si, i=1 . . . n, wherein n is a positive integer, Pi and Si respectively represent an i-th stage and an i-th secret data;
carrying out, by the trigger module, a measurement once at the starting point of each stage;
deciding, by the remote user, to send or refuse to send the secret data Si corresponding to the i-th stage to the confidential computing user based on results of the i-th measurement verification.

10. A confidential computing system, wherein the confidential computing system comprises a processor and a memory which stores instructions executed by the processor to implement the method of measuring the confidential computing application layer according to claim 1, wherein the method comprises the confidential computing virtual machine, wherein the trigger module is deployed in an underlying component in which the confidential computing virtual machine is capable of being measured, and the trigger module is started when the underlying component is loaded, and implements the trusted measurement of confidential computing on the static measurement characteristics of the underlying component based on confidential computing; and
the trigger module is configured to trigger the user-mode application needing to operate in a confidential computing environment, carry out the trusted measurement of the user-mode application, and embed the trusted measurement value M into a chip-level signature report to be sent to the remote user.

11. The confidential computing system according to claim 10, wherein the trigger module is deployed in a virtual machine (VM) memory file system or a kernel layer of the confidential computing virtual machine; and
the trigger module carries out static measurement and/or dynamic measurement on the user-mode application according to the setting.

12. The confidential computing system according to claim 10, wherein the trigger module is triggered to operate when the underlying component is loaded;
the underlying component of the confidential computing virtual machine comprise a virtual machine (VM) memory file system and a kernel layer; and
the trigger module is deployed in the VM memory file system or the kernel layer.

* * * * *